United States Patent Office 2,759,973
Patented Aug. 21, 1956

2,759,973

BIS-ISOTHIURONIUM SALTS

Charles H. Grogan, Falls Church, Va., and Leonard M. Rice, Baltimore, Md., assignors to Geschickter Fund for Medical Research Inc., New York, N. Y., a corporation of New York No Drawing. Application October 20, 1953,
Serial No. 387,315

5 Claims. (Cl. 260—564)

This invention relates to compositions of matter, particularly to chemotherapeutic organic compounds and methods for their preparation and more particularly to compounds useful as hypotensive agents.

Specifically, the invention involves the discovery and contemplates the disclosure of a novel class of compounds hereinafter referred to as the bis-isothiuronium salts, and as so referred to is intended to include N-substituted and N,N'-substituted bis-isothiuronium anionic salts, and methods of synthesizing such salts.

In addition to the discovery of these compounds, it has further been discovered that soluble bis-isothiuronium salts may be administered intravenously, intermuscularly, subcutaneously and intraperitoneally without ill effects and so administered have been found to possess a marked hypotensive effect.

Accordingly, it is a basic general object of the present invention to provide novel class of organic compounds and methods for the preparation thereof.

Another object is to provide novel type compounds characterized by chemotherapeutic or medicinal properties and particularly by the ability to induce a marked hypotensive effect.

A more specific object is to provide novel compounds, namely, and hereinafter referred to as the bis-isothiuronium salts characterized as in the object next above.

Another specific object is the provision of novel organic compounds, namely bis-isothiuronium salts represented by the general formula:

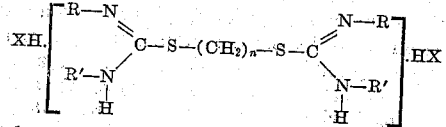

Another and equally important object of the invention is the provision of methods of synthesizing the novel class of compounds referred to in the foregoing objects.

These and further subordinate objects and the manner in which they are accomplished will become apparent to those conversant with the art from the following description of the general class of these novel compounds and certain specific examples of particular members of the class as well as general and specific methods for their synthesis.

The bis-isothiuronium salts, N-substituted and N,N'-substituted bis-isothiuronium salts may be represented by the generalized graphical formula:

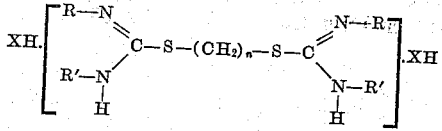

In the above formula, $n$, designating the number of methylene groups ($CH_2$) in the central chain may be any whole number from 1 to 12. R and R' are always dissimilar and may be alkyl or alkene groups or hydrogen having from 1 to 12 carbon atoms or may be aromatic rings selected from the class consisting of phenyl, methoxy-phenyl and naphthyl. X represents an anionic group selected from among the following: chlorides, bromides, iodides, sulfates, and acetates.

Still referring to the general formula, X, representing the anionic group, may be chloride, bromide, iodide, acetate or sulfate, all of which produce water-soluble products. It will be understood that the free bases may be obtained under proper conditions by careful addition of the equivalent of alkali.

The hydrohalide salts are freely soluble in water when R' is hydrogen or short alkyl chains or relatively small acylic rings such as phenyl. Water solubility decreases as R' becomes longer or more conjugated chains or rings, respectively, but remains sufficiently high to be useful, even with a substituent like alpha-naphthyl or butyl.

The type compounds which are the subject of the present invention may be prepared by reacting the appropriate alkyl halide with thiourea, or the appropriate N-substituted thiourea in a suitable solvent, for example 95% or absolute ethanol. In the case of the preparation of bis-isothiuronium salts in which R' is hydrogen any halide whether chloride, bromide or iodide may be used. In the case where R and R' are both radicals, i. e., where R' is not hydrogen, the chlorides do not react readily under the conditions of preparation but the desired bis-isothiuronium may be readily prepared by employing either the appropriate bromide or iodide.

The reaction solvent is not limited to ethanol, but other higher boiling alcohols may be used such, for example, as n-propanol, n-butanol or iso-amyl alcohol. However, the temperature and time of reaction must be carefully regulated and controlled when employing a reflux mixture that boils much over 100° C., as the yield may be cut down and the product contaminated by splitting the isothiuronium salts when formed with the formation of ammonium halides.

In carrying out the synthesis of any desired member of the type compound described herein, a time of reaction and method of isolation compatible with the particular halide and solvent used must be selected. For example, the use of absolute ethanol in lieu of 95% ethanol frequently results in a more readily crystallizable product and cuts down on the formation of hydrated oils. In some cases the product may be obtained equally well from either 95% or absolute ethanol. Furthermore, when a chloride is employed as the starting halide, either the time of reaction must be increased from 20 to 35% over that necessary when employing the correspondng bromide, or a higher boiling solvent, such as n-Butanol employed.

Two general procedures may be followed.

In the first, the appropriate bis-halide is mixed with the stoichiometric amount of thiourea or N-substituted thiourea and the whole treated with just enough 95% or absolute ethanol to just bring it into solution at the boiling point of the mixture. This mixture is refluxed for sufficient time to yield the desired state of completion of the reaction and allowed to cool, whereupon crystallization will ensue or may be induced by adding the desired grade of ethyl ether, U. S. P. or absolute as the case may be.

In the second procedure, the thiourea or N-substituted thiourea may be dissolved in the minimum amount of boiling solvant and the halide added from a suitable receptacle and the receptacle washed down with solvent on completion of the addition. With some of the lower bisbromides, and most of the iodides, addition must not be to rapid as the reaction is exothermic and may become violent.

In either of the procedures, a sub-amount of solvent, i. e., less than the amount required for complete solution, may be added and the material allowed to dissolve as the reaction proceeds. In such cases the product may solidify as a cake and require several recrystallizations for purification. By either of the above procedures the product is generally obtained (when not hydrated) in 99.5% purity as it comes from the reaction mixture.

The following examples of specific syntheses and resulting compounds are described herein to illustrate the general nature of the method and some of the modifications necessary in isolating specific compounds of the general class from the reaction mixtures.

EXAMPLE I

*Pentane-1,5 di(N-methyl)isothiuronium di-hydrobromide*

This compound was prepared by combining 4.1 grams, (0.045 mole) of N-methyl thiourea, melting point 117–18° C., and 5.23 grams (0.0227 mole) of pentane-1,5 dibromide, B. P. 79–80° C./5 mm., and refluxing the mixture for 6 hours in 6° c. c. of absolute ethanol. It was cooled to room temperature and then kept under refrigeration overnight but crystallization did not ensure. On adding absolute ether slowly until a permanent cloudiness resulted, an oil separated. Sufficient ether, e. g., 125 c. c., was added to throw out all the salt as an oil. Subsequent stirring and refrigeration for three days produced a crystalline mass of needles. These, on breaking up the mass, filtration, washing with ether, and drying in a vacuum over $P_2O_5$ overnight yielded 8.7 grams, or 93.6% of theory, of material having a melting point of 172–3° C. The bromide ion found was 38.93% or very close to the theoretical of 38.96%. Recrystallization of a small portion from absolute ethanol gave a material in fine needles that melted sharply at 177.5° C.

EXAMPLE II

*Butane-1,4 di(N-phenyl) isothiuronium di-hydrobromide*

10.0 grams (0.065 mole) of N-phenyl thiourea, melting point 154–5° C., and 7.1 grams (0.033 mole) of butane-1,4 dibromide, boiling point 198–9° C. were refluxed for 8 hours in 100 cc. of 95% ethanol. On cooling the reaction mixture to room temperature and then in an ice bath, crystallization had to be induced by adding ether. When approximately 20 cc. of ether had been added slowly with agitation, a permanent cloudiness remained and crystallization ensued rapidly to give a mass of fine needles. These were filtered off, washed successively with 10 cc. of cold ethanol with rapid suction and two 25 cc. portions of ether. The washings were combined with the mother liquor and another 100 cc. of ether added to the total. A second crop of crystals was obtained. On the first crystallization the yield was 11.2 grams of material having a melting point of 215–16° C., and on the second 3.0 grams having a melting point of 214–15° C., or a total of 14.2 grams, 83% of theory. Recrystallization did not change the melting point and Br⁻ assay gave 30.74% found, theory 30.72%.

EXAMPLE III

*Methylene di(N-allyl) isothiuronium dihydroiodide*

7 grams (0.06 mole) of N-allyl thiourea added to 8 grams (0.03 mole) of methylene iodide in 50 ml. of absolute methanol and refluxed 3 hours yielded on cooling an addition of absolute ether, an oil which finally crystallized on refrigeration and slurrying with fresh anhydrous ether to give 14.3 grams of product having a melting point 127–129° C. Recrystallization from absolute methanol-ethyl acetate yielded the compound in long large prisms and having a melting point of 132.5–134° C. Calculations indicated a theoretical I⁻ content of 50.88% in the product of this synthesis and an actual content of 50.75% was observed.

As an anti-mitotic agent in cancer, 5 milligrams of the soluble salt is injected preferably at the site of the tumor. The frequency of administration is determined by existing conditions. Such injections have been found to cause a profound and lasting regression of the tumor in certain types of animal cancer and without perceptible ill effects to the recipient and metastasizing of the malignancy was forestalled indefinitely.

From the foregoing disclosure of a novel class of compounds and examples of specific compounds of the class and methods for synthesis thereof it will be appreciated that other specific compounds of the general type may be obtained by similar or equivalent methods of synthesis. Accordingly, the presently disclosed exemplary compounds and methods are to be considered in all respects as illustrative and not restrictive, the scope of the discovery being indicated by the appended claims rather than the foregoing description, and all compounds and methods coming within the meaning and range of equivalency of the claims are therefore intended to be embraced therein.

What is claimed and desired to be secured by Letters Patent is:

1. As a novel composition of matter, pentane-1,5 di-(N-methyl) isothiuronium dihydrobromide.

2. As a novel composition of matter, butane-1,4 di(N-phenyl) isothiuronium dihydrobromide.

3. As a novel composition of matter, methylene di(N-allyl) isothiuronium dihydroiodide.

4. A novel composition of matter comprising a compound selected from the group consisting of bis-isothiuronium salts having the general graphic formula:

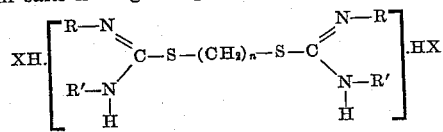

wherein $n$ is a whole number from 1 to 12 designating the number of methylene groups ($CH_2$); R is selected from the group consisting of alkyl and alkene groups having from 1 to 12 carbon atoms, phenyl, methoxyphenyl, and naphthyl; R′ is different from R and is selected from the group consisting of hydrogen, alkyl and alkene groups having from 1 to 12 carbon atoms and phenyl; and X is selected from the class of anionic groups consisting of chlorides, bromides, iodides, sulfates and acetates.

5. A therapeutic agent for the relief of hypertension comprising a compound defined in claim 4.

References Cited in the file of this patent

UNITED STATES PATENTS 2,545,876   Clemence _____ Mar. 20, 1951

OTHER REFERENCES

Organic Syntheses, 30, 35–37 (1950).
Bertram: Ber. Deut. Chem., 25, 59 (1892).
Noah: Ber. Deut. Chem., 23, 2199 (1890).